United States Patent
Kellberg (10) Patent No.: US 7,059,571 B2
(45) Date of Patent: Jun. 13, 2006

(54) DEPLOYABLE SPACECRAFT MOUNT FOR ELECTRIC PROPULSION

(75) Inventor: Christian J. Kellberg, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/371,838

(22) Filed: Feb. 21, 2003

(65) Prior Publication Data
US 2004/0164205 A1  Aug. 26, 2004

(51) Int. Cl.
B64G 1/26 (2006.01)

(52) U.S. Cl. .................... 244/169; 244/171.2
(58) Field of Classification Search ............ 244/169, 244/171.1, 171.2, 171.7, 172.6–172.9, 173.1, 244/173.3
See application file for complete search history.

(56) References Cited

U.S. PATENT DOCUMENTS

| | | | | |
|---|---|---|---|---|
| 5,349,532 A | * | 9/1994 | Tilley et al. ............... | 244/164 |
| 5,383,631 A | * | 1/1995 | Mazzini .................... | 244/169 |
| 5,984,236 A | * | 11/1999 | Keitel et al. .............. | 244/164 |
| 6,032,904 A | * | 3/2000 | Hosick et al. ............. | 244/169 |
| 6,053,455 A | * | 4/2000 | Price et al. ............... | 244/169 |
| 6,135,394 A | * | 10/2000 | Kamel et al. .............. | 244/169 |
| 6,296,207 B1 | * | 10/2001 | Tilley et al. .............. | 244/169 |
| 6,478,257 B1 | * | 11/2002 | Oh et al. .................. | 244/172 |

OTHER PUBLICATIONS

G. Saccoccia et al., "Electric Propulsion: A Key Technology for Space Missions in the New Millennium," (2000), EESA Bulletin 101, 10 pp.

Gary A. Hallock et al., "Development and Application of the Beamserver Code for Plume Impact Analysis on Satellite Communication," (2001), American Institute of Aeronautics & Astronautics, AIAA-2001-3354, pp. 1-11.

Ira Katz et al., "A Hall Effect Thruster Plume Model Including Large-Angle Elastic Scattering," (2001), American Institute of Aeronautics & Astronautics, AIAA-2001-3355, pp. 1-15.

"Advanced Extremely High Frequency (AEHF) Satellite Communications System," (2001), FY01 Annual Report, pp. 1-2.

* cited by examiner

*Primary Examiner*—Galen Barefoot
(74) *Attorney, Agent, or Firm*—Gates & Cooper LLP (57) ABSTRACT

An apparatus and method including a deployable spacecraft mount for electric propulsion is disclosed. A typical apparatus includes a spacecraft body, a deployable element having at least two basic positions including a compact stowed position and a deployed position of the element and an electric thruster disposed on the deployable element where the electric thruster is disposed to mitigate negative plume effects in the deployed position that would be present in stowed position. The deployable element can be a radiator and can optionally be disposed on a second deployable payload module. Further, deployable elements can be selective deployed such that some electric thrusters can be used to assist in transfer orbit while undeployed elements help retain heat.

20 Claims, 10 Drawing Sheets

DEPLOYABLE SPACECRAFT MOUNT FOR ELECTRIC PROPULSION

BACKGROUND OF THE INVENTION

1. Field of the Invention

The present invention relates to apparatuses and methods for the implementation of electric propulsion in spacecraft. Particularly, the present invention relates to mounting solutions for Hall effect thrusters to mitigate harmful thruster plume effects.

2. Description of the Related Art

In recent years, electric propulsion systems, e.g. xenon ion propulsion systems, have been implemented in spacecraft. Current high power applications of this thruster now make it possible to accomplish both orbit raising and station keeping. This combination may yield an all electric spacecraft with a propulsion system several times lighter than a chemical system. However, electric thruster plumes are typically wide and avoiding spacecraft structure can be problematic. Particularly, Hall effect electric thrusters (operating without front grids) are known to have widely dispersed plumes resulting in a significant potential for negative plume interactions.

Conventionally, electric propulsion thrusters, including Hall effect thrusters, are mounted either on the spacecraft body or to other primary structure. Within this general class there are offset orthogonal mounts, e.g., thruster pairs that fire parallel to each other through lines of action at equal offsets from the center of gravity. See, e.g. Director, Operational Test & Evaluation FY2001 Annual Report, Advanced Extremely High Frequency (AEHF) Satellite Communications System, which is incorporated by reference herein.

On the other hand, canted mounts can be designed such that both thrusters fire directly through the center of gravity at an angle. The canted angle allows the plumes to be directed away from each other and spacecraft structure, however there is loss for each thruster based on the cosine of one half the angle between the intersecting thruster lines. See, e.g. G. Saccoccia et al., Electric Propulsion: A Key Technology for Space Missions in the New Millennium, ESA Bulletin, February 2000, which is incorporated by reference herein.

In addition, hybrid mounting designs can provide canted offsets (canted thrusters which are offset and do not fire through the center of gravity) and obtain some of the benefits each fundamental type. That is, such designs can have plumes directed away from each other and spacecraft structure by the canted angles and further displaced from each other and spacecraft structure by the offsets, however, there will be a loss based upon the severity of the canted angle.

With any of these conventional arrangements, however, plumes from electric propulsion thrusters can have adverse effects on antenna performance, loss of radiator panel efficiency and loss of solar cell efficiency that are directly related to the location of electric thrusters on spacecraft. These effects can occur through direct sputtered material deposition as well as secondary back flow charge exchange plasma that focuses ion impingement on spacecraft surfaces.

Generally, the location of such thrusters is driven by the control efficiency gained from their firing orientation being through the spacecraft center of gravity. The proximity of these thrusters to the body of the spacecraft, as the result of this orientation requirement, ensures that there will be plume interaction that will increase the risk of performance degradation over the typical satellite mission life. This effect is of particular concern when considering a typical 10 to 15 year communication satellite life and the lack of on-orbit data that can correlate to the known effects observed in ground tests.

In view of the foregoing, there is a need for spacecraft designs which mitigate the adverse effects of electric propulsion thruster plumes. Further, there is a need for such designs to be made compatible with existing subsystems, minimizing additional separate structure and mechanisms. As discussed hereafter, the present invention meets these and other needs.

SUMMARY OF THE INVENTION

The present invention addresses the industry-acknowledged difficulty of integrating electric propulsion thrusters, e.g. Hall effect thrusters (non-gridded electric thrusters), on spacecraft, in a benign fashion. To fully leverage the mass savings that Hall thrusters can yield, they must also be positioned to fire through the spacecraft center of gravity. The application of the present invention builds upon some existing innovations for deployable radiators and ion thrusters. Described in this disclosure is a apparatus and method where electric thrusters are located (depicted as a Hall effect thruster) on a spacecraft to mitigate the known deleterious effects of their plume field on subsystems, including deployed antennae, solar panels and radiator surfaces. With the development of high thrust electric propulsion systems and their planned placement on diverse programs, such as Lockheed's AEHF offering and ESA's XEUS spacecraft, the present invention improves upon conventional spacecraft designs that implement these thrusters.

Embodiments of the present invention address plume interaction issues for electric propulsion to yield a more reliable, better quality design. The invention is applicable to any spacecraft design where there is a concern about long term product reliability and a low tolerance for risk that cannot be addressed by any on orbit data for this next generation propulsion system.

The application of this invention can yield dividends in the life and performance of a spacecraft. The effects of contamination from ion engines can reduce spacecraft life by years. The negative effects of plume interaction has already been observed for 13 cm xenon ion propulsion system (XIPS) thrusters on existing spacecraft, due to their proximity and orientation with respect to the battery pack radiators. Additionally current spacecraft employing solar panel concentrators may also experience negative effects from XIPS plume interaction.

Established trends for the increased thermal dissipation of high power payloads portend the use of deployable radiator panels. Examples of high power and high mass spacecraft design problems, that can only be resolved with the incorporation of electric propulsion, already exist and all electric propulsion spacecraft have been proposed in numerous industry studies. By coupling the location of electric thrusters on deployable radiators, these high mass payloads with increased thermal demands can coincidentally provide a solution for both plume interaction while facilitating optimal firings through the spacecraft center of gravity.

Embodiments of the present invention can comprise a configuration that employs the design concept of a flight-proven spacecraft model utilizing deployable radiators to provide an electric thruster mounting location more removed from the spacecraft body and critical antenna surfaces, such as mesh and shaped reflectors. The negative effect of plume interaction is greatly reduced or eliminated by the increased displacement from the spacecraft body surfaces and the decreased number of particle intercept angles with these surfaces. Current deployed radiator spacecraft designs can be implemented with outboard thruster mounting locations approximately 6 to 8 feet away from the spacecraft body. As a one time event, utilizing the deploying radiator as a supporting structural platform for the electric thruster makes this an ideal location.

Exemplary embodiments of the invention detailed hereafter show characterizations of the plume field from a Hall effect thruster as a function of angle, disposed on a typical spacecraft deployed radiator and a multiple aperture communications payload. The benefit of this configuration, versus spacecraft body mounted locations, is readily apparent. Also presented are identical mounting locations in their stowed configuration to illustrate how the electric thrusters may still be advantageously fired for orbit raising purposes in other embodiments. In both cases, it is also apparent how thruster pairs acting as equal offset couples can fire through the spacecraft center of gravity by being fired parallel to each other through lines of action at equal offsets from the center of gravity.

A typical embodiment of the invention includes a spacecraft body, a deployable element having at least two basic positions including a compact stowed position and a deployed position of the element and an electric thruster disposed on the deployable element where the electric thruster is disposed to mitigate negative plume effects in the deployed position that would be present in stowed position. The deployable element can comprise a deployable radiator for transferring excess heat energy from the spacecraft body. Often, the electric thruster is disposed on an outboard end of the deployable element.

In further embodiments, a gimbal is disposed between the electric thruster and the deployable element for positioning the electric thruster. Embodiments of the invention are well suited for use with Hall effect thrusters, however other thrusters types, such as convention ion gridded thrusters can be used. In addition, embodiments can include an additional deployable spacecraft element, such as a payload module, where the deployable element is disposed on the additional deployable spacecraft element.

In some embodiments, the electric thruster is designed to fire substantially along a line offset from a center of gravity of the spacecraft body when the deployable element is in the deployed position. Further, the electric thruster can be paired with another electric thruster where the pair of thrusters fire along lines at canted angles through a center of gravity of the spacecraft body when the deployable element is in a deployed position. The pair of thrusters can also combine these principles, firing along canted angles through lines offset from the spacecraft center of gravity.

Finally, in some embodiments the spacecraft body can include one or more additional deployable elements where each deployable element has at least one electric thruster disposed thereon. The deployable elements are selectively deployed in a transfer orbit such that electric thrusters of deployed elements assist transfer and undeployed element assist heat retention

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

1.0 Deployable Spacecraft Elements

As discussed above, obtaining adequate thruster offset is important to mitigate negative plume effects while maintaining acceptable thruster efficiency. Typically, spacecraft include a main body which provides the foundational platform for the spacecraft. To fit within a compact envelope for transport, e.g., within a launch vehicle shroud, many spacecraft elements (e.g., appendages and/or subsystems) can be designed to be deployable. At various stages during the launch the various elements are deployed to enable complete spacecraft functionality on orbit. Except where indicated otherwise, within the present application a deployable element is an element of the spacecraft coupled to the spacecraft through a movable joint of some type that facilitates at least two basic states, a compact stowed position and a deployed position of the element. There is a substantial difference between the physical envelope occupied by the element in the stowed position compared to the deployed position. The moveable joint can comprise one or more moveable joints, such as rotary or linear joints or four-bar mechanisms. Further, motion of the appendage can be driven by any acceptable means, such as motors or springs.

Some examples of well known deployable spacecraft elements include antennae (such as reflector dishes), solar panels, sensor suites and other deployable payload modules. More recently, deployable radiator panels have been developed to facilitate improved heat removal from higher powered the spacecraft. It should be noted that deployable spacecraft elements are distinguished from spacecraft elements that are merely locked or unlocked. For example, a gimbal mechanism for a thruster may be locked during launch to prevent damage to the device and unlocked on orbit to allow movement of the thruster. As such, the gimbal mechanism is not deployable element as defined herein because there is no substantial change in the state of the element between the locked and unlocked states. The thruster and gimbal occupy substantially the same physical envelope whether the gimbal is locked or unlocked. Thus, an unlocked gimbal is not disposed to eliminate negative plume effects that would otherwise be present in locked position.

2.0 Basic Thruster Mounting Configurations

As previously mentioned, two basic mounting practices can be used, alone or in combination, to mitigate any negative effects of thruster plumes interacting with the spacecraft. A detailed description of the basic principles involved is provided here. It should be noted that although the following mounting configurations are described involving thrusters in pairs, implementation of the invention detailed hereafter does not require thruster pairs.

Figure 1A:
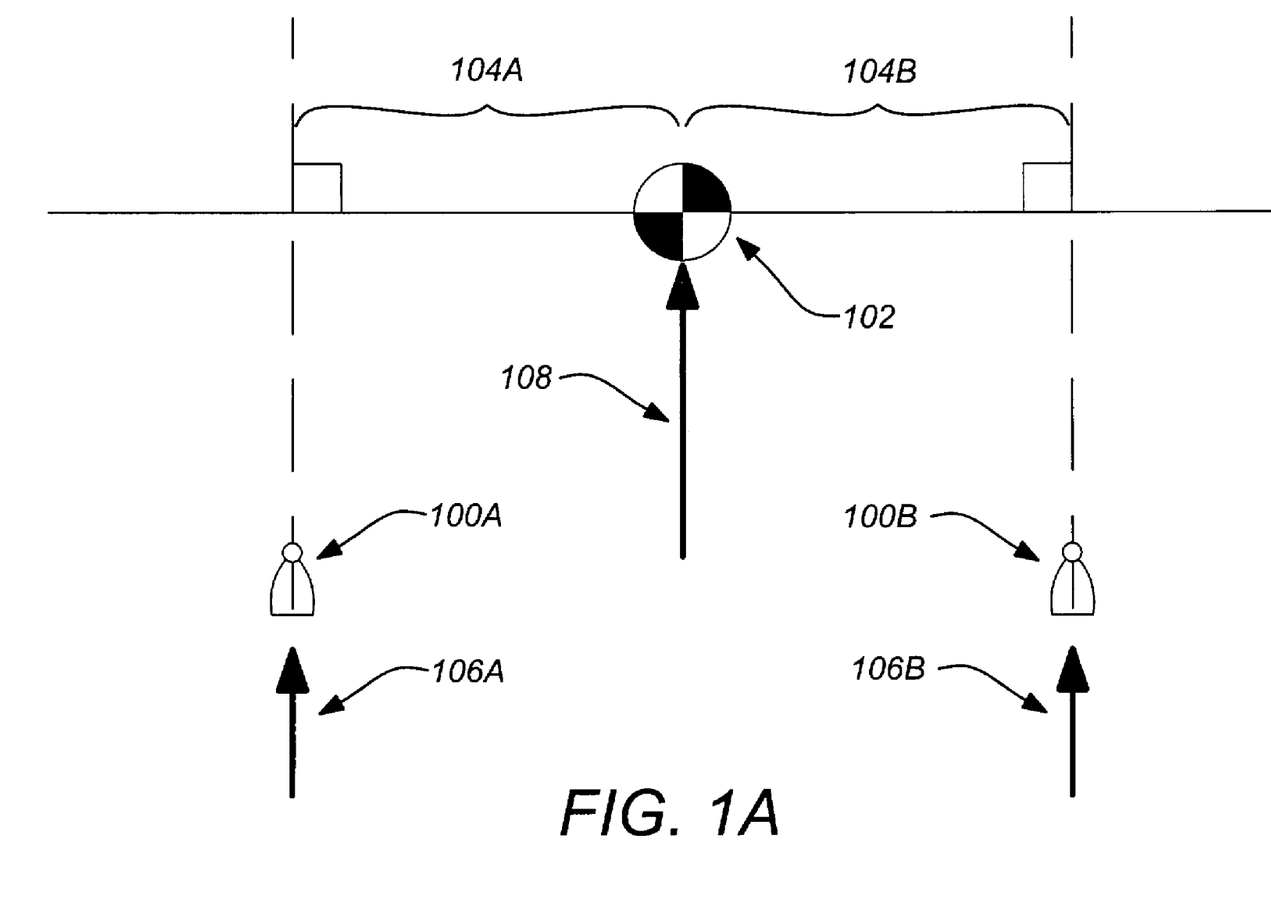
FIGS. 1A–1C illustrate thruster mounting for offset, canted and offset-canted mounting configurations, respectively.

FIG. 1A illustrates a thruster pair arranged in an offset orthogonal configuration. The electric thrusters 100A, 100B each fire along separate lines that are orthogonal to a line that intersects the center of gravity 102. The lines are equally and oppositely positioned away from the center of gravity 102 by offsets 104A, 104B. Thus, the forces 106A, 106B from each thruster 100A, 100B act through the center of gravity 102 of the spacecraft as a combined force 108. The ability to mitigate plume interaction between the thrusters 100A, 100B for such offset orthogonal mounts depends directly upon whether adequate offsets 100A, 100B can be accommodated by the spacecraft design. Thus, designs with offset orthogonal mounts can be difficult to produce without negative plume interaction between the thrusters as well as with other spacecraft structure, e.g. deployed payload and solar panels.

Figure 1B:
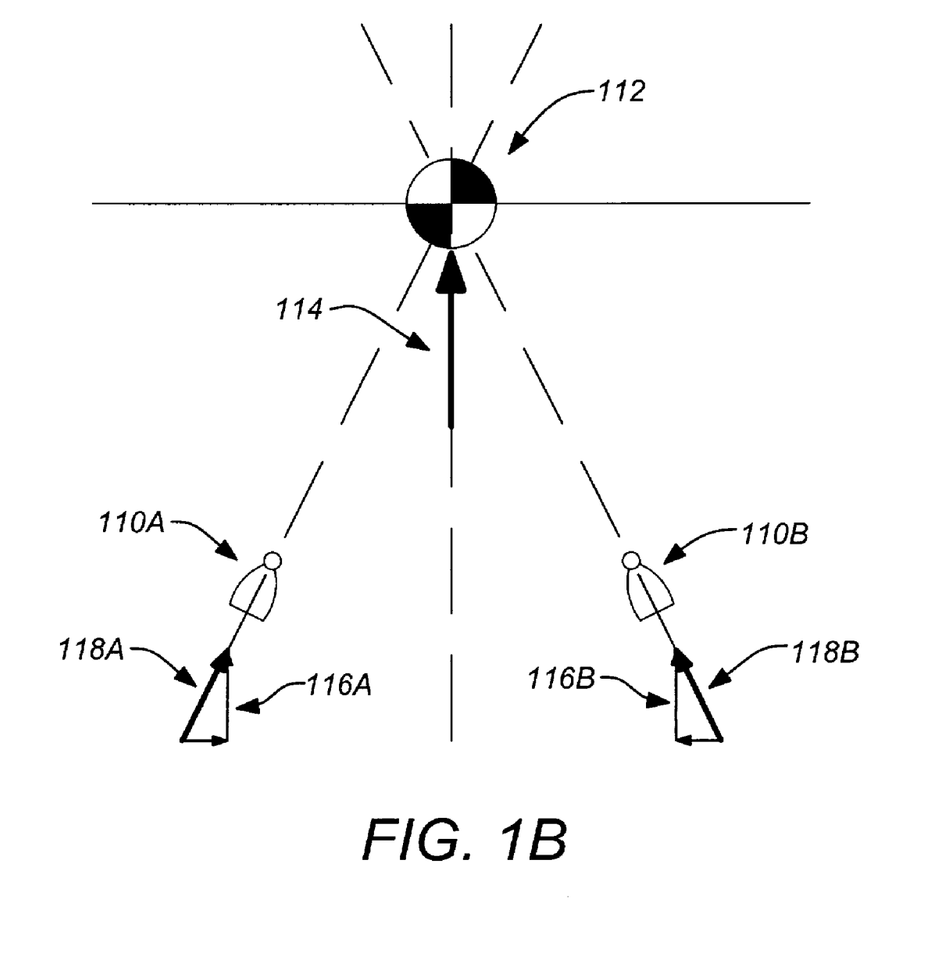
Figure 2:
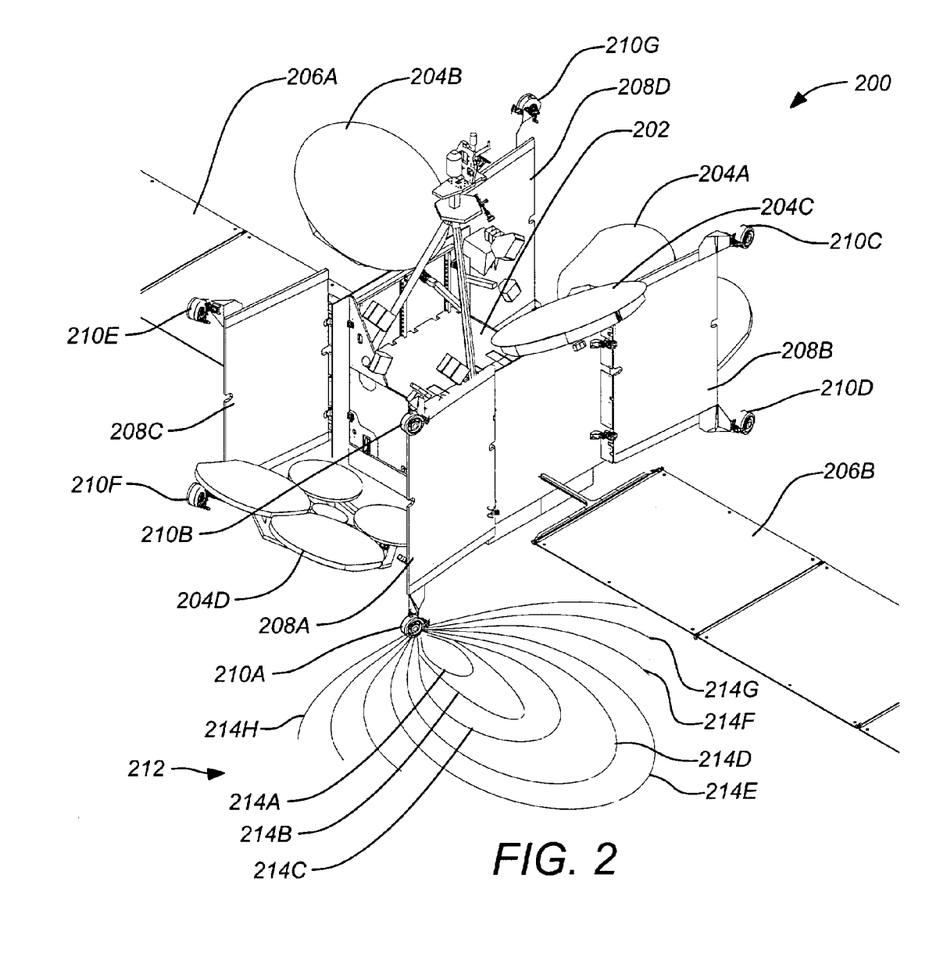
FIG. 2 illustrates an exemplary deployed satellite in an on-orbit configuration including an embodiment of the invention.

FIG. 1B illustrates a thruster pair arranged in a canted configuration. The thrusters 110A, 110B are mounted at a canted angle relative to the centerline and through the center of gravity 112. In this case, the combined force 114 acting through the center of gravity is only the summation of the component forces 116A, 116B that act in the same direction (vertical as shown in FIG. 2B) from the overall force 118A, 118B from each thruster. Thus, canted mounts have a disadvantage of an inefficient firing direction (and may still have some plume interaction issues as well).

Figure 1C:
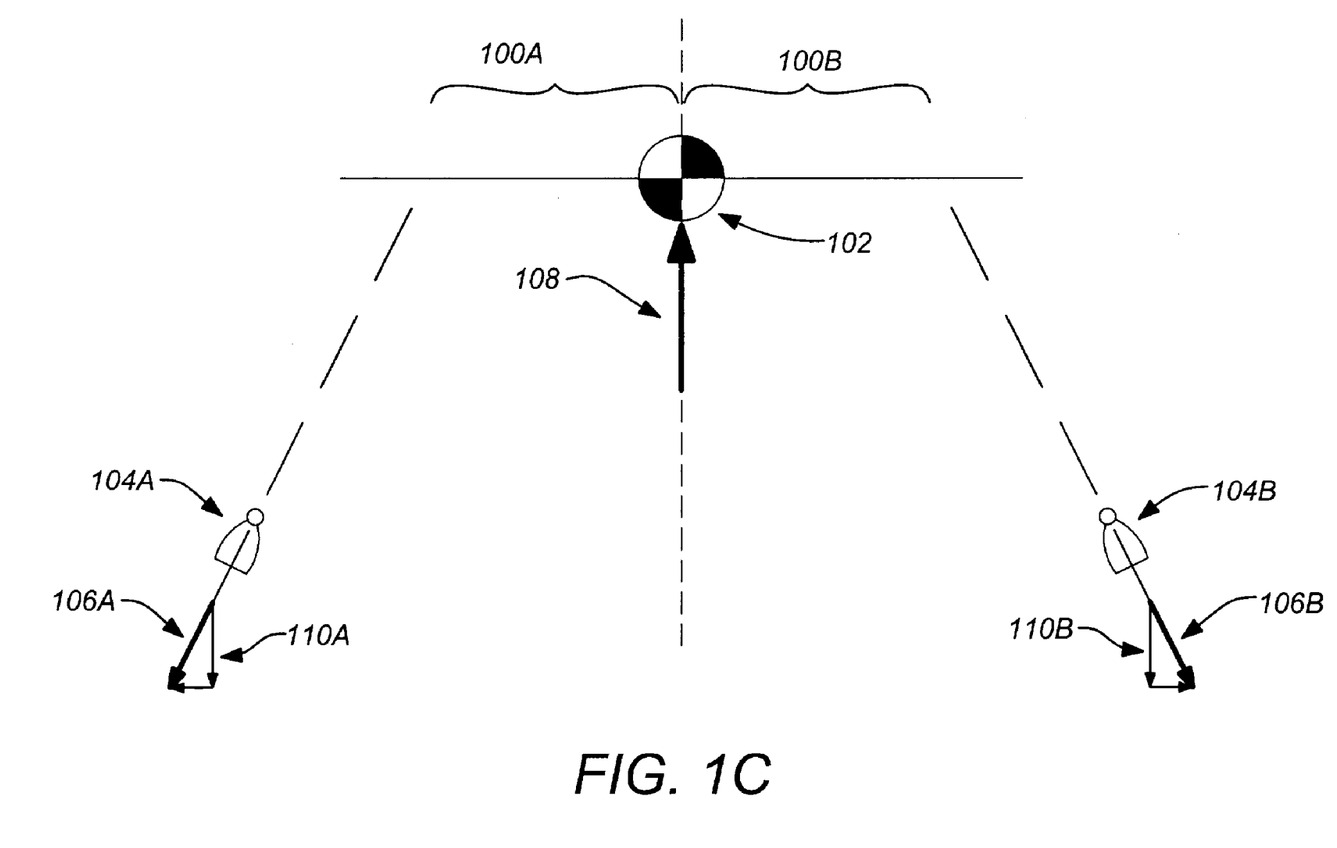

FIG. 1C illustrates a thruster pair arranged in a canted and offset configuration. The thrusters 120A, 120B are mounted at a canted angle relative to a centerline through the center of gravity 122. In this case, however, the canted lines from the thrusters are not directed through the center of gravity but instead are displaced away from the center of gravity 122 by offsets 124A, 124B. Here also, the combined force 126, acting through the center of gravity, is only the summation of the component forces 128A, 128B that act in the same direction from the overall force 130A, 130B from each thruster. As shown, the offsets and canted mounts in combination make it is easier to separate the thruster plumes.

3.0 Electric Thruster Plume Mitigation

The present invention allows a greater distance between a thruster plume and the spacecraft structure, thereby minimizing the likelihood of any negative plume interactions. In addition, the invention allows a greater separation between the thruster plumes of thruster pairs, mitigating another type of potentially negative plume interaction.

FIG. 2 illustrates a typical deployed satellite 200 in an on-orbit configuration including an exemplary embodiment of the invention to illustrate the principle. The spacecraft body 202 provides the main platform for the various functional elements of the spacecraft, including deployable reflector assemblies 204A, 204B, 204C, 204D (commonly referenced as 204), deployable solar wings 206A, 206B (commonly referenced as 206) and deployable radiators 208A, 208B, 208C, 208D (commonly referenced as 208). A key principle of present invention is that the electric thrusters 210A, 2101B, 210C, 210D, 210E, 210F, 210G (commonly referenced as 210) are disposed on deployable elements, the deployable radiators 208 in this example. Note that an eighth electric thruster 210 is obscured in from view in FIG. 2.

As previously discussed, electric thruster can exhibit relatively large plumes, particularly Hall electric thrusters. Furthermore, Hall effect thrusters have a less focused plume density than gridded ion engines, e.g., XIPS thrusters, (by as much as two orders of magnitude), making their optimal placement even more critical to spacecraft life. Consequently, Hall thrusters will be used in the examples hereafter, although other electric thrusters, such as gridded electric thrusters, can also be implemented with the invention. One of the thrusters 210 depicted in FIG. 2 is shown with a graphic representation of the associated plume particle field 212. The particle field 212 shows the current density, as a measure of where interactions may occur, as a series of contours 214A–214H (commonly referenced as 214). The current density decreases by a factor of ten with each subsequent contour 214 from the center of the thrust vector. For clarity, the plume characteristics are shown on a two-dimensional plane corresponding to the closest approach toward the deployed, rotating solar wing 206B. It can be seen that the further outboard placement of the thruster 210A on the deployed radiator 208A will further decrease the plume density that a solar wing 206 panel (and other spacecraft subsystems) may encounter by several orders of magnitude. Thus, the thrusters 210 are disposed at an outboard end of the radiators 208. The thrust vector represented by the particle field 212 is in a typical North orientation for a geosynchronous satellite, which is the primary direction for station keeping thruster firings.

Hall effect thruster plume effects are discussed by G. A. Hallock et al., Development and Application of the Beam-server Code for Plume Impact Analysis on Satellite Communication, 37$^{th}$ AIAA/ASME/SAE/ASEE Joint Propulsion Conference, AIAA-2001-3354, July 2001, incorporated by reference herein. The wide angle plume dispersion characteristics are also discussed by I. Katz et al., A Hall Effect Thruster Plume Model Including Large-Angle Elastic Scattering, 37$^{th}$ AIAA/ASME/SAE/ASEE Joint Propulsion Conference, AIAA 2001-3355, July 2001, incorporated by reference herein. Both references draw on extrapolated near field (~1 m) measurements of a Hall effect thruster plume to model far field shape. While these references deal with the modeling of plume shape and placement considerations, neither propose a solution or method to substantially mitigate these effects as the present invention. Ground test measurements, limited by evacuation chamber size, all show large or near hemispheric characteristics. Although plume densities decrease by orders of magnitude with large angles, leveraging this to facilitate spacecraft mounting options, will be negated by reaching an equivalent narrow angle effect, with a long operational satellite life, on a cumulative basis. An all electric propulsion study, including applications and cost comparisons for approximately 5 to 12 KW payloads has been developed.

Figure 3A:
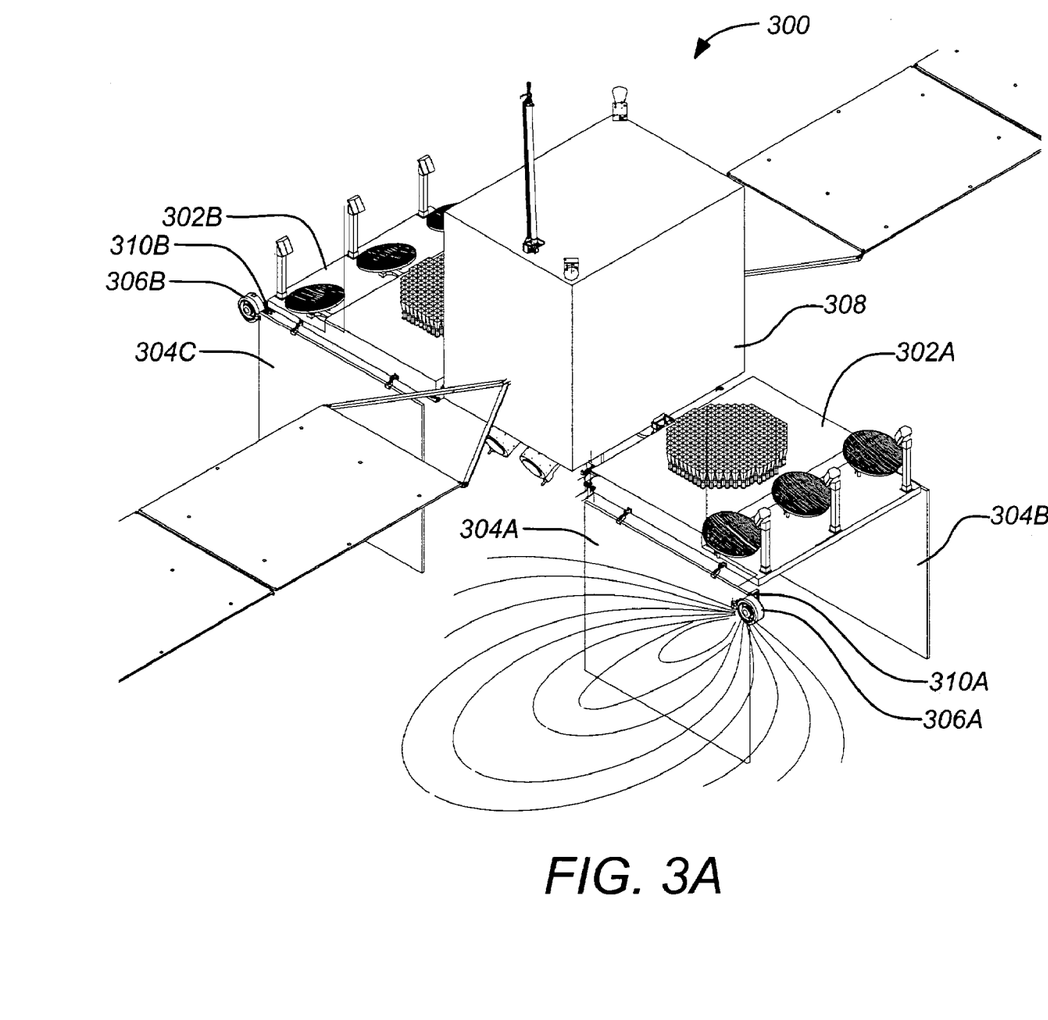
FIG. 3A illustrates an alternate exemplary spacecraft configuration including an embodiment of the invention.

FIG. 3A shows an alternate satellite 300 in a configuration with deployable payload modules 302A, 302B (commonly referenced as 302) and deployable radiators 304A, 304B, 304C (commonly referenced as 304), with mounts for electric thrusters 306A, 306B (commonly referenced as 306) deploying from these modules 302. The modules 302 include various devices such as antennae and sensors and deploy from the spacecraft body 308 from a compact position for launch. The radiators 304 can be initially deployed in the same orientation as heritage spacecraft.

Thus, the invention can be implemented building on existing spacecraft designs. The Hall effect thrusters 306 can be mounted to extension brackets and gimbal mechanisms 310A, 310B (commonly referenced as 310) at the corner of each deployed radiator 304 where they can move freely with the gimbal mechanism 310 to vary the orientation from North/South to East/West for additional station-keeping orbit corrections. When both the radiators 304 and the modules are deployed, the thrusters 306 are disposed on an outboard end of the radiator (although other edges are available that are further outboard relative to the spacecraft body 308).

Embodiments of the present invention can utilize existing gimbal mechanisms. In an exemplary existing electric thruster designs, a thruster platform is mounted with 25 cm electric thrusters. The gimbals are configured to accommodate movement through gimbal angles that prove the feasibility of moving or deploying a xenon ion gas-supplied thruster while continuously connected to supply lines. In addition, the flexibility of current spacecraft looped heat pipe coils demonstrates that radiators can deploy and cycle through the proposed angle range for thruster locations of the present invention.

Figure 3B:
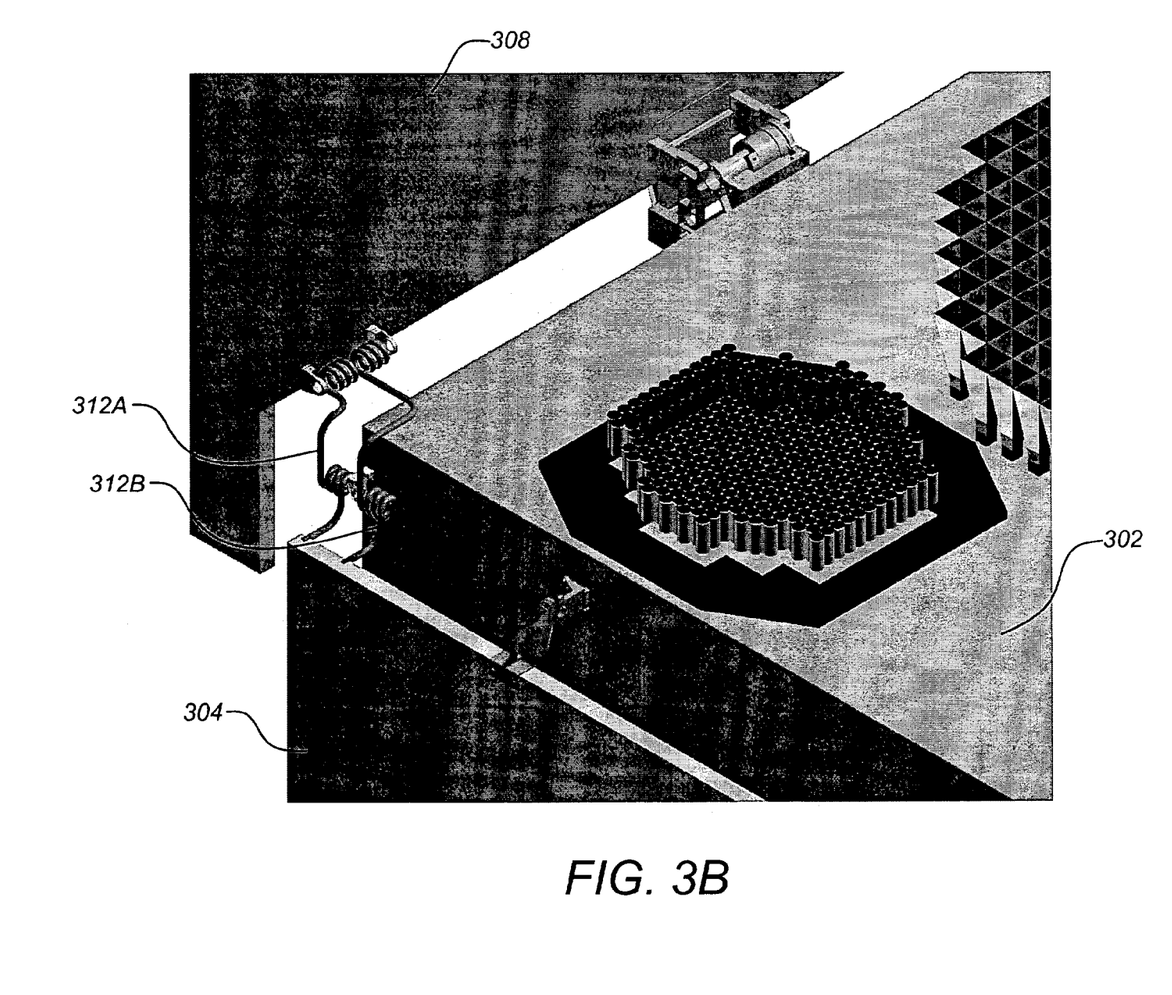
FIG. 3B is another detailed view of the alternate exemplary spacecraft configuration.

FIG. 3B is another detailed view of the alternate spacecraft configuration of FIG. 3A showing that the ion gas (e.g., xenon) supply lines 312A, 312B (commonly referenced as 312) for the electric thrusters 306 can be fashioned in a manner similar to current looped heat pipe coils (used facilitate the deployable radiators 304) to enable a two-axis deployment. The supply lines 312 run from the spacecraft body 308 to the deployable module 302 across the first moving interface (i.e., the first axis) through a first coil. Next, the supply lines 312 run from the deployable module 302 across the second moving interface (i.e., the second axis) through a second coil. The first and second coils are used to accommodate the movement of each interface, enabling a secure fluid connection.

Figure 4A:
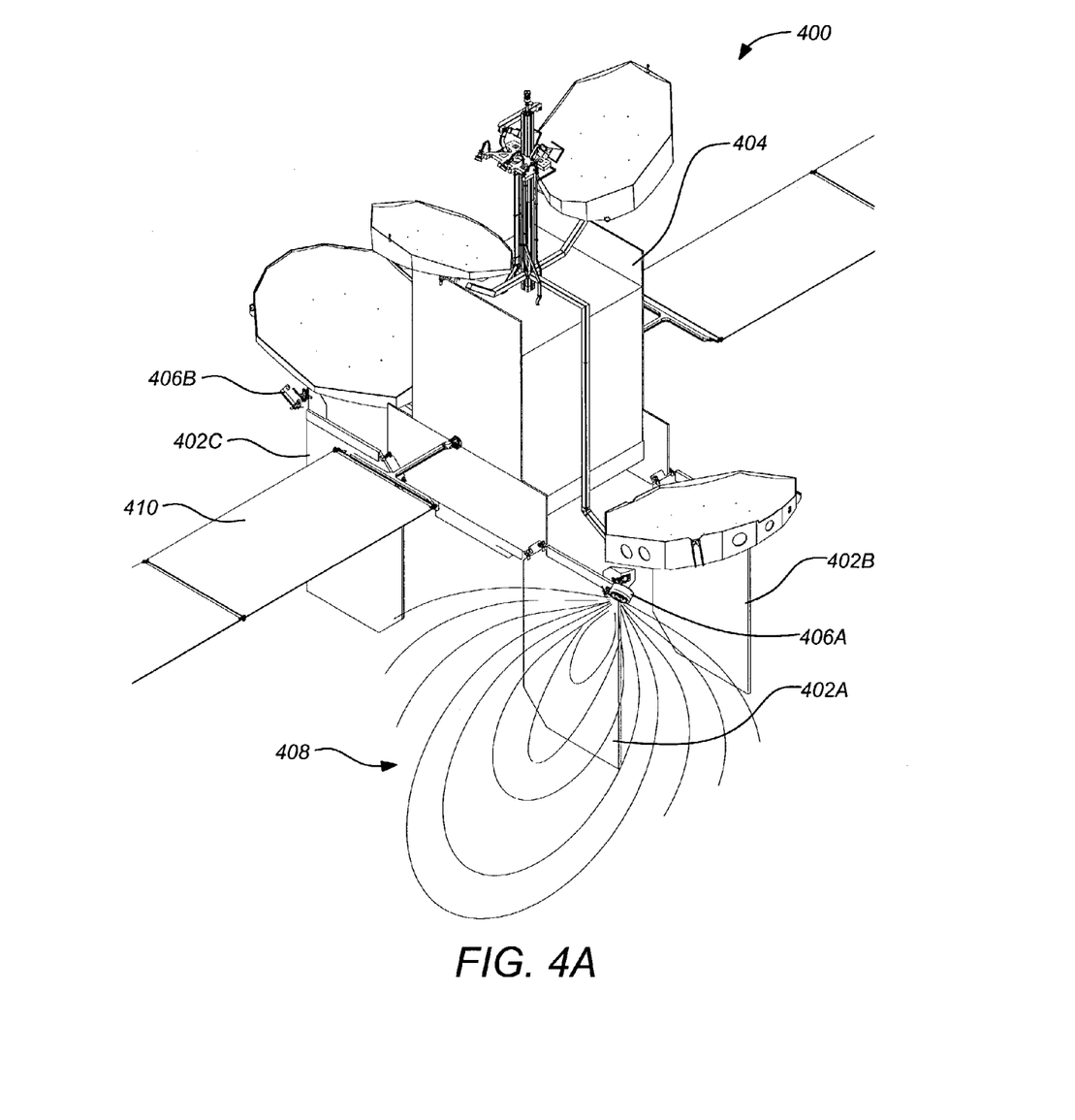
FIG. 4A illustrates a second alternate exemplary spacecraft configuration including an embodiment of the invention.

FIG. 4A illustrates a second alternate exemplary spacecraft configuration. In this case, the spacecraft 400 includes deployable radiators 402A, 402B, 402C (commonly referenced as 402) that are designed to deploy along hinge lines at an angle with the spacecraft body 404. That is, the hinge lines do not run along an edge of the spacecraft body 404. In this particular example, the hinge lines are located in a canted position at the aft corners of spacecraft body 404. Thus, the electric thrusters 406A, 406B (commonly referenced as 406) are disposed along an outboard edge of the radiators 402 when they are deployed.

Figure 4B:
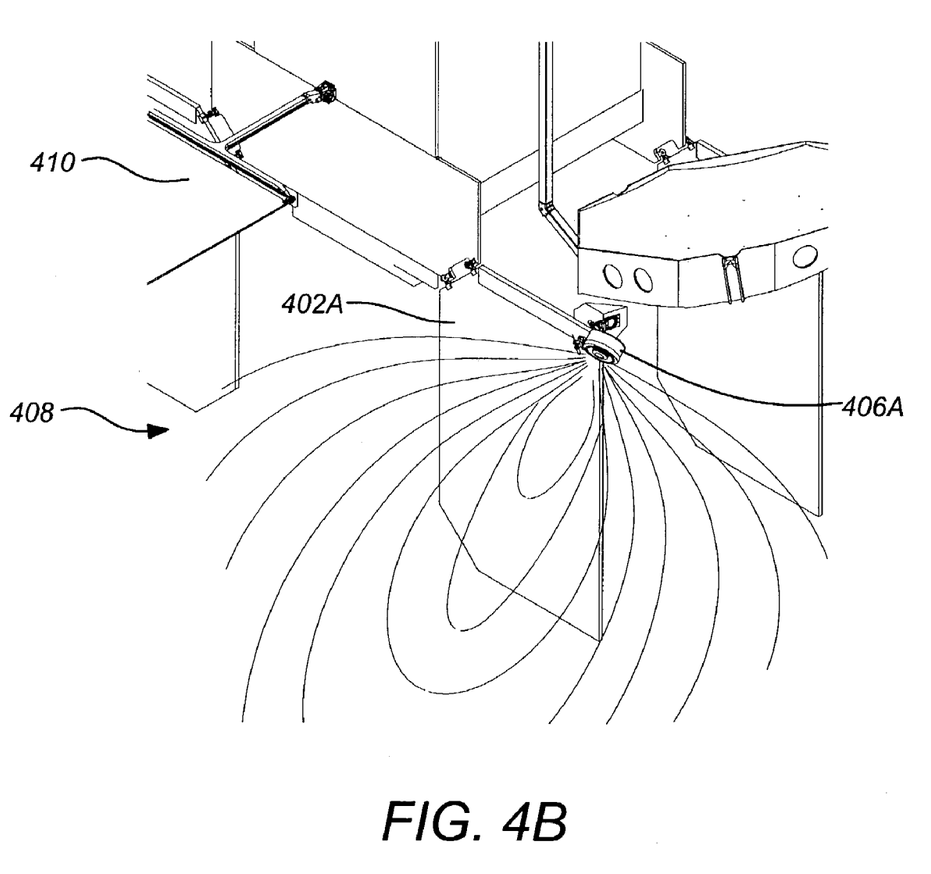
FIG. 4B illustrates a detailed portion of the second alternate exemplary spacecraft configuration.

FIG. 4B is a detailed view of the second alternate exemplary spacecraft configuration of FIG. 4A. In this view, the plume 408 is shown well clear of the spacecraft body 404, and particularly the solar wing 410.

3.0 Electric Thruster Thermal Subsystem Facilitation

Figure 5:
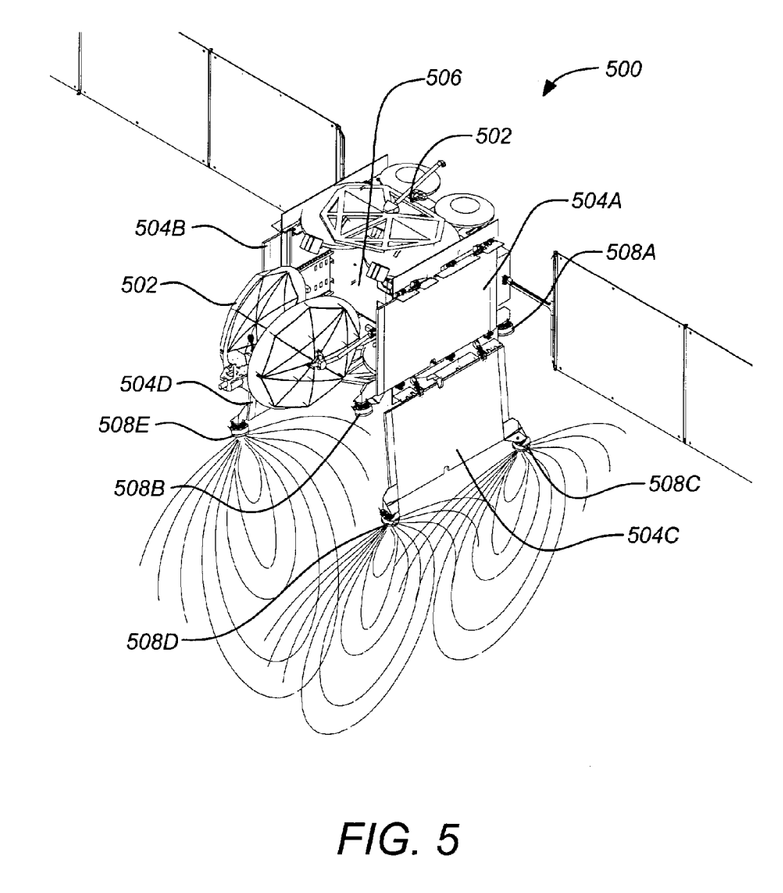
FIG. 5 illustrates an exemplary transfer orbit configuration including a further embodiment of the present invention.

FIG. 5 shows yet another embodiment of the invention used in a transfer orbit configuration. The exemplary spacecraft 500 of this embodiment maintains the payload (including reflectors 502 and other deployable elements) and some radiator panels 504A, 504B (commonly referenced as 504) are in a stowed configuration relative to the spacecraft body 506. The on-orbit, station keeping electric thrusters 508A, 508B (commonly referenced as 508) are disposed on these radiator panels 504A, 504B but not fired in the transfer orbit, to maintain payload heat. (In addition, the plumes would have negative interactions with the spacecraft 500.) A second set of radiators 504C, 504D deploy with electric thrusters 508C, 508D, 508E in the transfer orbit and act to dissipate heat from the electric thruster's power source. The spacecraft 500 is oriented such that the thrust vectors of the thrusters 508C, 508D are in an orbit radian direction to assist the transfer orbit.

This mode of selective radiator deployment, while maintaining payload temperatures and allowing the high power levels associated with electric propulsion to dissipate, represents a further embodiment of the invention. The deployed radiators with electric thrusters mounted will both enable the thermal subsystems during transfer as well as distance the thrusters from the deployed solar panels to mitigate the aforementioned plume issues.

4.0 Method of Implementing the Invention

Figure 6:
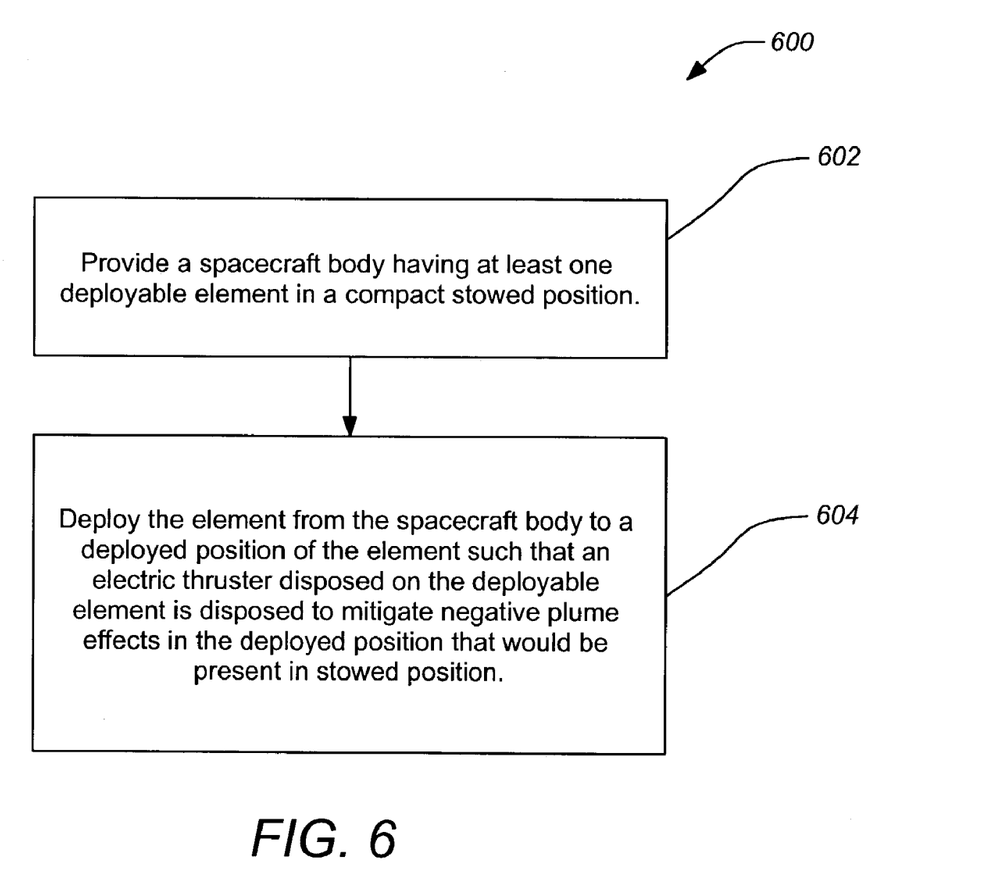
FIG. 6 is flowchart illustrating an exemplary method of implementing the present invention.

FIG. 6 is flowchart illustrating an exemplary method of implementing the present invention. The method 600 includes providing a spacecraft body having at least one deployable element in a compact stowed position at step 602. At step 604, the element is deployed from the spacecraft body to a deployed position of the element such that an electric thruster disposed on the deployable element is disposed to mitigate negative plume effects in the deployed position that would be present in stowed position. The method 600 can be further modified by the additional and alternate structural elements previously described.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. An apparatus, comprising:
    a spacecraft body;
    a deployable element, coupled to the spacecraft body, the deployable element selected from the group consisting of an antenna, a solar panel, a sensor suite, and a payload module, the deployable element having at least two positions including a stowed position and a deployed position;
    one or more electric thrusters disposed on an outboard end of the deployable element, the one or more electric thrusters producing a force acting through a spacecraft center of gravity.

2. The apparatus of claim 1, wherein the deployable element comprises a deployable radiator for transferring excess heat energy from the spacecraft body.

3. The apparatus of claim 1, wherein the electric thruster is a Hall effect thruster.

4. The apparatus of claim 1, wherein the one or more electric thrusters fire along lines at canted angles through the spacecraft center of gravity when the deployable element is in the deployed position.

5. The apparatus of claim 1, further comprising an additional deployable spacecraft element where the deployable element is disposed on the additional deployable spacecraft element.

6. The apparatus of claim 5, wherein the deployable element comprises a deployable radiator and the additional deployable spacecraft element comprises a deployable payload module.

7. The apparatus of claim 5, wherein the additional deployable spacecraft element comprises a deployable payload module.

8. The apparatus of claim 1, wherein the electric thruster is disposed to mitigate negative plume effects in the deployed position that would be present in stowed position.

9. The apparatus of claim 1, further comprising a gimbal disposed between the electric thruster and the deployable element for positioning the electric thruster.

10. The apparatus of claim 1, wherein the deployable element extends along a first axis when in the deployed position and wherein the one or more electric thrusters are disposed along the first axis.

11. A method, comprising the steps of:
providing a spacecraft body having at least one deployable element in a compact stowed position, the deployable element selected from the group consisting of an antenna, a solar panel, a sensor suite, and a payload module; and
deploying the deployable element from the spacecraft body, the deployed element having one or more electric thrusters disposed to produce a force acting through a spacecraft center of gravity and on an outboard end of the deployed element to mitigate negative plume effects upon the deployed element.

12. The method of claim 11, wherein the deployable element comprises a deployable radiator for transferring excess heat energy from the spacecraft body.

13. The method of claim 11, wherein the electric thruster is a Hall effect thruster.

14. The method of claim 11, wherein the one or more electric thrusters fire along lines at canted angles through the spacecraft center of gravity when the deployable element is in the deployed position.

15. The method of claim 11, further comprising an additional deployable spacecraft element where the deployable element is disposed on the additional deployable spacecraft element.

16. The method of claim 15, wherein the deployable element comprises a deployable radiator and the additional deployable spacecraft element comprises a deployable payload module.

17. The method of claim 15, wherein the additional deployable spacecraft element comprises a deployable payload module.

18. The method of claim 11, wherein the element is deployed from the spacecraft body such that the electric thruster disposed on the deployable element is disposed to mitigate negative plume effects in the deployed position that would be present in stowed position.

19. The method of claim 11, further comprising the step of providing a gimbal disposed between the electric thruster and the deployable element for positioning the electric thruster.

20. The method of claim 11, wherein the deployable element extends along a first axis when in the deployed position and wherein the one or more electric thrusters are disposed along the first axis.

* * * * *